United States Patent [19]  [11] 4,448,345
Helms  [45] May 15, 1984

[54] COMPOSITE LID

[75] Inventor: Charles R. Helms, Malvern, Pa.

[73] Assignee: Container Corporation of America, Chicago, Ill.

[21] Appl. No.: 402,939

[22] Filed: Jul. 29, 1982

[51] Int. Cl.³ .................................................. B65D 51/20
[52] U.S. Cl. ...................................... 229/43; 215/232; 220/258; 220/359
[58] Field of Search ................. 215/232; 220/359, 258, 220/319; 229/5.5, 43; 156/69, 272.4

[56] References Cited

U.S. PATENT DOCUMENTS

| | | | |
|---|---|---|---|
| 2,393,541 | 1/1946 | Kohler | 20/0.5 |
| 3,154,617 | 10/1964 | Schenk et al. | 220/338 X |
| 3,391,846 | 7/1968 | White | 229/17 R |
| 3,632,004 | 1/1972 | Grimes | 215/232 |
| 3,861,549 | 1/1975 | Watson et al. | 215/232 |
| 3,928,109 | 12/1975 | Pollock et al. | 156/69 |
| 3,938,686 | 2/1976 | Milligan et al. | 229/43 X |
| 3,968,823 | 7/1976 | Simon | 215/232 X |
| 4,013,188 | 3/1977 | Ray | 215/232 X |
| 4,171,084 | 10/1979 | Smith | 229/43 |
| 4,264,316 | 4/1981 | Knudsen | 156/69 X |

FOREIGN PATENT DOCUMENTS

| | | | |
|---|---|---|---|
| 500032 | 2/1954 | Canada | 215/232 |
| 1043071 | 9/1966 | United Kingdom | 156/272.4 |

Primary Examiner—George E. Lowrance
Assistant Examiner—Gary E. Elkins
Attorney, Agent, or Firm—Richard W. Carpenter; Davis Chin

[57] ABSTRACT

A composite lid, for use in a sealable closure arrangement, comprising a plastic rim, a paperboard center panel, and peelable membrane removably attached to the paperboard panel, and a method of forming same.

1 Claim, 3 Drawing Figures

COMPOSITE LID

BACKGROUND OF THE INVENTION

1. Field of the Invention

This invention relates generally to closure arrangements and more particularly to a composite lid including a releasable membrane which is heat sealable to and readily peelable from the rim of a container.

2. Description of the Prior Art

A prior art search directed to the subject matter of this application to the United States Patent and Trademark Office disclosed the following U.S. Pat. Nos.: 2,393,541; 3,391,846; 3,968,823; 4,013,188.

None of the prior art patents uncovered in the search disclosed a composite lid including an outer plastic rim portion and a paperboard central portion, having laminated thereto by a conductive material, a membrane made from non-conductive material and adapted to be heat sealed to, but peelable from, the rim of a container.

SUMMARY OF THE INVENTION

This invention relates to sealable closure arrangements for containers, and it is an object of the invention to provide an improved composite lid which may be heat sealed to a container and thereafter removed therefrom in parts, with the outer part being lifted off and the inner part being peeled from the container rim.

A more specific object of the invention is the provision of a composite lid including an outer plastic rim and inner composite panel including a membrane formed of non-conductive material which is releasably secured to another portion of the panel by a conductive adhesive material, and which is heat sealed to the rim of the container and readily peelable therefrom.

These and other objects of the invention will be apparent from an examination of the following description and drawings.

It will be understood that, for purposes of clarity, certain elements may have been intentionally omitted from certain views where they are believed to be illustrated to better advantage in other views.

DESCRIPTION OF THE PREFERRED EMBODIMENT

Figure 3:
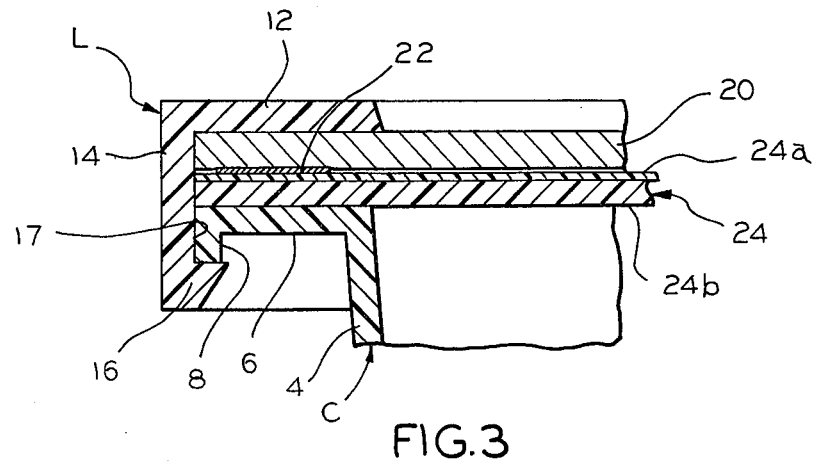
FIG. 3 is a view similar to FIG. 2, but showing the lid attached to the rim of a container.

Referring now to the drawings for a better understanding of the invention, and particularly to FIG. 3, it will be seen that the invention includes a composite lid indicated generally at L, adapted for a sealing engagement with the rim of a container indicated generally at C.

Figure 1:
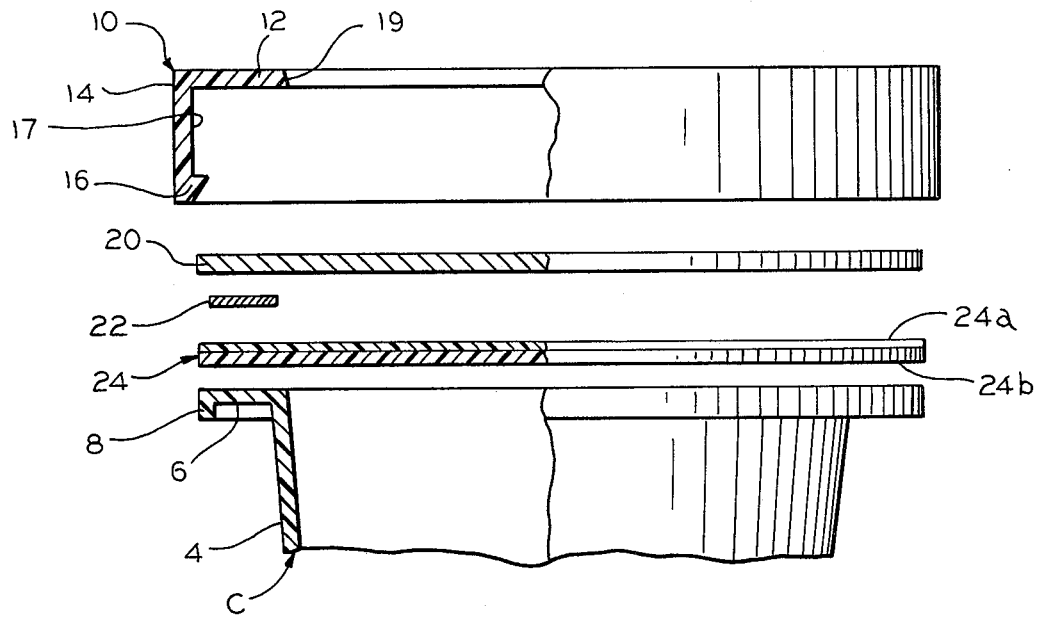
FIG. 1 is an exploded, fragmentary vertical sectional view of the components of a container and a lid embodying features of the invention.

As best seen in FIGS. 1 and 3 container C includes a tubular body side wall 4 having formed integrally therewith and projecting radially outwardly from the upper edge thereof an annular horizontal flange 6 which, in turn, has a vertical flange 8 formed integrally with and depending from the outer edge thereof. The flanges 6 and 8, which form a rim for container C, are made of plastic or are plastic coated, so as to be heat sealable with a portion of the closure member as hereinafter described.

Figure 2:
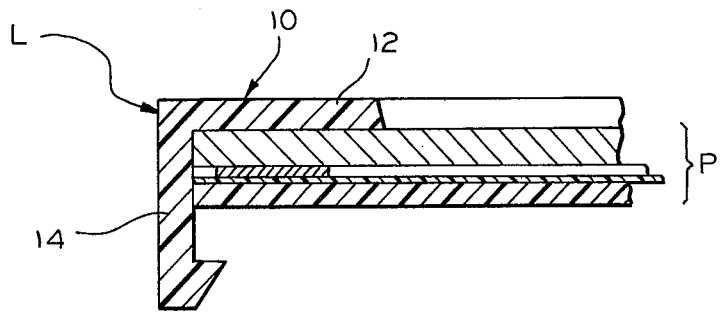
FIG. 2 is a view similar to FIG. 1, but with the various components of the container lid secured to each other in assembled condition.

Turning now to FIGS. 1 and 2, it will be seen that the composite lid L has an annular plastic rim indicated generally at 10 which includes a horizontal ledge 12 and, formed integrally with and depending from the outer edge thereof, a tubular skirt 14 having at its lower end an integral, inwardly extending lip 16. Lip 16, skirt 14, and ledge 12 define an annular groove or recess 17 for receiving the rim of the container in a manner hereinafter described. The rim 10, as previously mentioned, is annular and has a central opening 19 which is closed by a composite panel indicated generally at P and hereinafter described.

As best seen in FIG. 1, the composite panel P includes a preferably round central upper panel 20 which is formed of relatively thin printable sheet material, such as paperboard, and a membrane indicated generally at 24 which is secured at a marginal area to the underside of panel 20 by a means of an adhesive 22.

Membrane 24 is a relatively thin flexible material, preferably a laminate, having an upper layer 24a of Saran and a lower layer 24b of polyethylene or some other type of material which is heat sealably compatible with the material in the rim of the container to which the lid is to be attached.

It is to be understood that the membrane 24 is formed entirely of a non-conductive material which, of course, is much less expensive than metallic foil type material commonly used in this type of closure.

It is also to be understood that in the present invention the adhesive material which is used to temporarily secure a marginal area of the upper surface of the membrane 24 to a marginal area of the lower surface of panel 20 is a conductive material such as, for example, a wax containing metallic particles.

The purpose of the conductive adhesive material 22 is two fold. First, it serves to secure the central panel 20 to the membrane 24 temporarily until these combined two panels can be attached to the plastic rim of the lid in a manner hereinafter described. Second, its serves to provide heat to effect the heat sealing between the membrane and the container rim by radio generated frequency sealing.

After the composite panel P has been formed, it may be bonded to the rim 10 of the lid L by an insert injection molding method of the type disclosed in U.S. Pat. No. 3,154,617, wherein the composite panel is inserted into a mold and then plastic is injected into the mold to form the rim around the panel and bond the rim to the panel.

After the lid has been formed in the manner previously described, it can then be attached to the rim of a container and sealed thereto by radio generated frequency sealing. The metal particles or other conductive material of the adhesive 22 generate the heat required to effect a heat sealing between adjacent portions of the underside of the membrane and the upper side of the container rim. At the same time the heat generated to serves to dissipate the adhesive 22, so that, when the lid is removed from the container, in a subsequent step, the panel 20 is readily separated from the membrane 24, leaving only the membrane covering the container.

The heat sealable connection between the peripheries of the membrane and the container is such that it will permit the membrane to be peeled away from the container to afford access to the contents of the container. The lid can then be snapped over the rim of the container to effect a reclosure.

Thus, it will be appreciated that the invention provides a relatively simple closure arrangement utilizing a minimum of expensive material.

What is claimed is:

1. A composite lid for use in a sealable closure arrangement with a container having a rim surface formed of a heat sealable material, said lid comprising:
   (a) an annular rim formed of molded plastic and including:
      (i) a horizontally disposed, radially inner ledge;
      (ii) a vertically disposed, radially outer skirt formed integrally with an outer portion of said ledge;
   (b) a central panel formed of a sheet of relatively thin printable sheet material, such as paperboard, and having a marginal area bonded to the underside of said rim ledge;
   (c) a membrane formed of an upper layer of Saran and a lower layer of polyethylene, said lower layer of polyethylene being compatible with the material of said container rim;
   (d) a temporary adhesive of a wax type material filled with metal particles disposed between said upper layer of Saran and said central panel at a marginal area thereof above the sealing area of the container rim, said membrane having the marginal area of its upper side of said upper layer of Saran releasably secured to the underside of said central panel by said temporary adhesive which will maintain said membrane and central panel attached to each other during formation of the lid in an insert molding process but which will deteriorate when the underside of said membrane is releasably attached to said container rim by radio generated frequency sealing.

* * * * *